United States Patent [19]
Gore

[11] Patent Number: 6,035,030
[45] Date of Patent: Mar. 7, 2000

[54] RE-ESTABLISHMENT OF A PRIVATE CIRCUIT IN A TELECOMMUNICATIONS SYSTEM

[75] Inventor: John W Gore, St. Helens, United Kingdom

[73] Assignee: Mitel Semiconductor Limited, United Kingdom

[21] Appl. No.: 08/972,910

[22] Filed: Nov. 18, 1997

[30] Foreign Application Priority Data

Nov. 28, 1996 [GB] United Kingdom ............ 9624723

[51] Int. Cl.[7] ........................................ H04M 3/42
[52] U.S. Cl. ................................ 379/209; 379/201
[58] Field of Search ............................ 379/209, 210, 379/211, 212, 201, 221, 45, 46, 39, 40, 42, 34

[56] References Cited

U.S. PATENT DOCUMENTS 5,566,236 10/1996 MeLampy et al. ............ 379/201
5,706,339 1/1998 Eisdorfer et al. ............ 379/211
5,862,208 1/1999 MeLampy et al. ............ 379/212

FOREIGN PATENT DOCUMENTS 0 550 975 A2 7/1993 European Pat. Off. .
2 282 938 4/1995 United Kingdom .

Primary Examiner—Krista Zele
Assistant Examiner—Benny Q. Tieu
Attorney, Agent, or Firm—Kirschstein, et al.

[57] ABSTRACT

System X telecommunications system has a private circuit employing a switched connection, the circuit connecting from an originating subscriber to a terminating subscriber via an original directory number, and is controlled so that when the connection is terminated, an attempt is made to re-establish the connection from the originating subscriber by use of an alternative directory number where an indication is received that a further call may be successful, the attempt to re-establish the connection is repeated using the original and alternative directory numbers alternately until the call is re-established.

4 Claims, 1 Drawing Sheet

RE-ESTABLISHMENT OF A PRIVATE CIRCUIT IN A TELECOMMUNICATIONS SYSTEM

BACKGROUND OF THE INVENTION

TECHNICAL FIELD

A new type of private circuit is being introduced for System X for digital exchanges which uses a switched connection instead of a hard-wired or nailed-up connection. This will automatically dial-up a predetermined directory number whenever the resource is 'in-service free'.

System X was a stored-program-controlled (SPC) telecommunications system introduced into the United Kingdom in the early 1980's and introduced elsewhere since.

SUMMARY OF THE INVENTION

According to the present invention there is provided a System X telecommunications system, having a private circuit employing a switched connection, the circuit connecting from an originating subscriber to a terminating subscriber via an original directory number, comprising control means whereby, when the connection is terminated, an attempt is made to re-establish the connection from the originating subscriber by use of an alternative directory number.

DESCRIPTION OF THE PREFERRED EMBODIMENT

Figure 1:
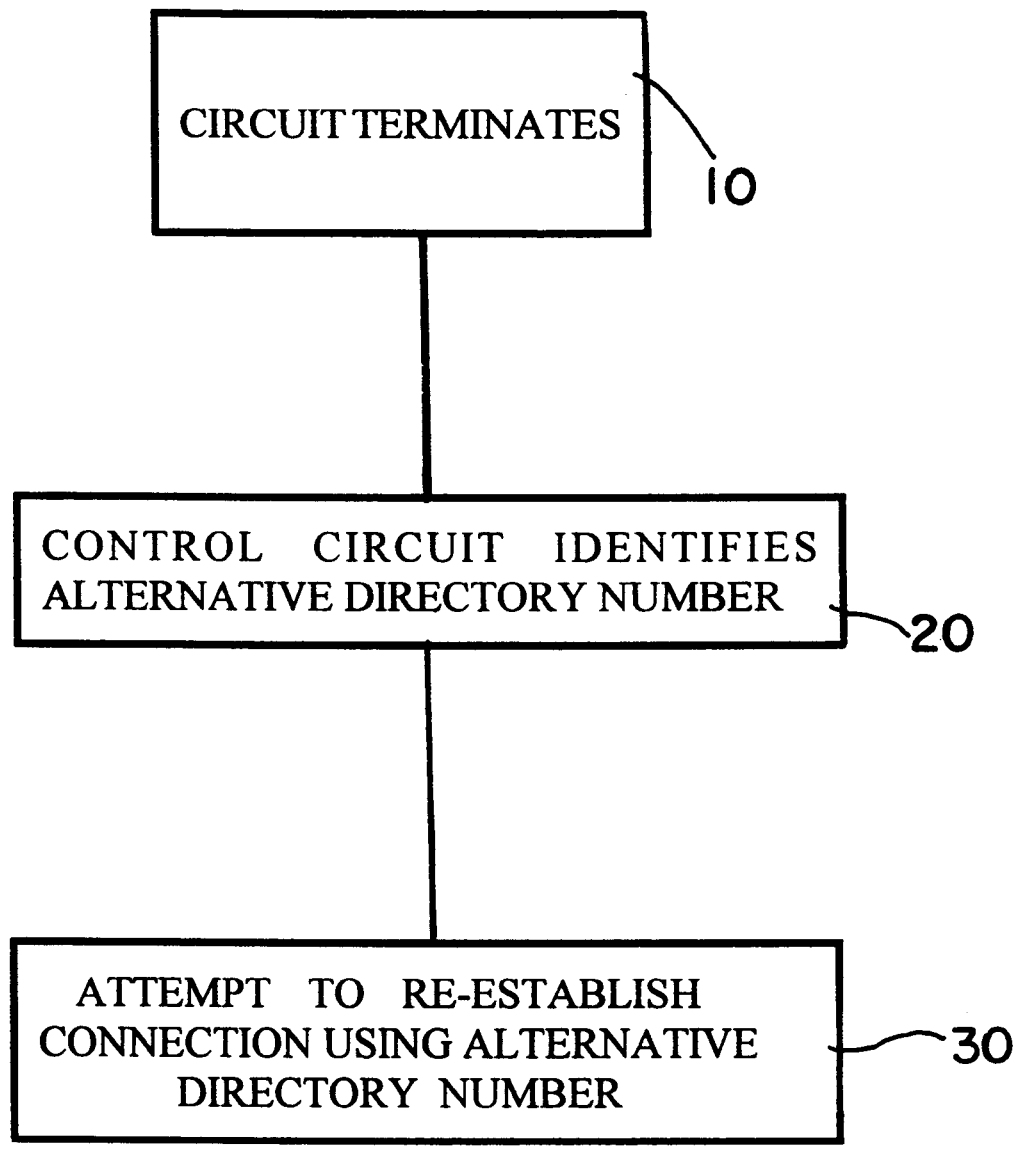
FIG. 1 shows a flow chart illustrating the present invention.

As shown in FIG. 1, the present invention is directed to a System X telecommunications system having a private circuit employing means for establishing a switched connection as a replacement for a hard-wired connection. The private circuit uses the means for establishing a switched connection to place a call from an originating subscriber to a terminating subscriber via an original directory number. A control circuit is operative, when the switched connection is terminated (as represented by block 10), to identify an alternative directory number (as represented by block 20), and to attempt to re-establish the switched connection from the originating subscriber to the terminating subscriber by use of the alternative directory number (as represented by the block 30). The originating subscriber is barred from incoming calls and the terminating subscriber is barred from outgoing calls.

Two new resources are introduced—a new variant of subscriber (DSB) and a DN table to hold the predetermined directory numbers.

The variant of Subscriber (DSB) is similar to the existing private circuit subscriber (DSB type 14) but is provided with additional parameters. The extra parameters effectively create a new type of private circuit—Automatic Private Circuit (APC). The APC would be a dependent of any type of Mk2 line controller (LCN types 8 to 17) or MK3/4 Line controllers (LCT) excluding Direct Dial Incoming (DDI) lines.

The extra parameters are:

i. APC type—originating or terminating.
An originating APC is Incoming Call Barred while a terminating APC is outgoing call barred.

ii. Call type—Analogue or Digital.
Identifies if a 64 kbits connection is required. If a 64 kbits connection is required, then the line controller must be ISDN.

iii. Primary DN index—Index to resource holding DN.
The Primary and Secondary DN index indirectly identify a directory number. An originating APC will use the DN identified by the DN index for call origination. A terminating APC validates the OLI of a terminating call against either directory number.

iv. Secondary DN index—Index to resource holding destination DN.
See Primary DN index above.

A new resource (APC DN table) is introduced to store the DNs. This resource is based per concentrator and is dimensioned to support 64 12 digit DNs.

On the return to service of the subscriber (DSB), the originating APC would originate a call to the associated DN (identified via index to primary/secondary DN parameter). Whenever a clear indication is received from the network the call is cleared and a new call sequence initiated.

The exchange would validate the terminating call's OLI against the APC's DN index.

Any signalling from the line is ignored/discarded by the exchange.

The following is applicable when trying to establish a APC:

There are 2 categories of termination reasons (try again and abort) and the required action is listed below:

Category a. Try again—Repeat attempt might be successful.
If the reason falls into this category, then an alternative DN is tried. If the alternative DN also fails then a delay of 60 seconds is inserted before trying the original DN again. The above procedure will repeat until the call is established.

Examples of Category 'a' reasons

| | |
|---|---|
| OVERLOAD | BLOCKING |
| CONGESTION | CALLED LINE BUSY |
| SUBSCRIBER IS PARKED | REPEAT ATTEMPT (EARLY OR LATE) |
| SUBSCRIBER IS ENGAGED | TERMINAL CONGESTION |
| SUBSCRIBER'S CONCENTRATOR ISOLATED | |
| PBX HAS NO FREE SELECTABLE LINES | |

Category b. Abort tying to set up a call to DN.
An alternative (primary/secondary) DN is tried. If this also receives a category 'b' reason then a fault report is generated containing the termination reason and the APC is put out of service (OOS).

Examples of Category 'b' reasons:
SUBSCRIBER IS TEMPORARILY OUT OF SERVICE (TOS)
SUBSCRIBER IS PERMANENT ICB
NUMBER UNOBTAINABLE SUBSCRIBER IS OUT OF SERVICE
SUBSCRIBER IS PREARRANGED OR SUBSCRIBER CONTROLLED ICB
NON OPERATOR CALL TO A TRUNK SUBSCRIBER
DIGITAL OR CAT1 CALL TO ANALOGUE SUBSCRIBER
DIGITAL OR CAT1 CALL TO RECORDED INFORMATION SERVICE (RIS)

DIVERTED CALL TO SUBSCRIBER WITH DIVERSION NOT ACCEPTABLE

FRAUDULENT ACCESS TO A PREMIUM PHONE SERVICE PROVIDED CALL, MARKED AS PRIVATE, TO SUBSCRIBER WITH CALLER IDENTITY WITHHELD BLOCKING SERVICE

Glossary

APC Automatic Private Circuit
CAT1 Digital Call requiring 64 kbits/s bearer
DDI Direct Dialling In
DN Directory Number
DSB DSSS Subscriber
DSSS Digital Subscriber Switching Subsystem
ICB Incoming Calls Barred
LCN MK2 Line Controller
LCT MK3/4 Line Controller
OLI Originating Line Identity
OUS Out of Service

I claim:

1. A System X telecommunications system having a private circuit employing means for establishing a switched connection as a replacement for a hard-wired connection, the private circuit using the means for establishing a switched connection to initiate a call from an originating subscriber to a terminating subscriber via an original directory number of the terminating subscriber, the system comprising: control means, when the switched connection is terminated, for attempting to re-establish the switched connection from the originating subscriber to the terminating subscriber by use of an alternative directory number of the terminating subscriber, the originating subscriber being barred from receiving incoming calls from the system, and the terminating subscriber being barred from placing outgoing calls over the system.

2. The telecommunications system as claimed in claim 1, wherein the control means is further operative, when an indication is received that a further call may be successful, to repeat to attempt to re-establish the switched connection using the original and the alternative directory numbers alternately until the call is re-established.

3. The telecommunications system as claimed in claim 1; and further comprising validation means to validate the directory number of the call to the terminating subscriber.

4. The telecommunications system as claimed in claim 2; and further comprising validation means to validate the directory number of the call to the terminating subscriber.

* * * * *